Figure 6:
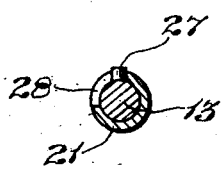

May 3, 1927.

J. COWIE 1,627,013

STOVEPIPE DAMPER

Filed July 30, 1926

INVENTOR
JOHN COWIE.

BY *Fetherstonhaugh & Co*
ATT'YS.

Patented May 3, 1927.

1,627,013

UNITED STATES PATENT OFFICE.

JOHN COWIE, OF SUTHERLAND, SASKATCHEWAN, CANADA.

STOVEPIPE DAMPER.

Application filed July 30, 1926, Serial No. 126,008, and in Canada June 2, 1926.

This invention relates to improvements in stove pipe dampers and the objects of the invention are to provide a damper for stove pipes or the like which can be manually operated in the usual way to open or close and which will also automatically operate to close the pipe on a certain predetermined temperature being reached.

A further object is to provide a temperature operable damper for stove pipes or the like of simple and durable construction that can be readily fitted to stove pipes at present in use without materially, or in fact in any way, affecting the existing construction.

With these and other objects in view, the invention consists essentially in the combination with a stove pipe or the like of a damper provided with a key operable by hand and operatively connected to a weighted lever arm in turn suspended by a fusible support whereby, on a certain temperature being reached, the lever arm is automatically disconnected and dropped to close the damper.

Figure 7:
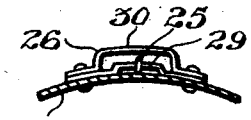
Figure 3:
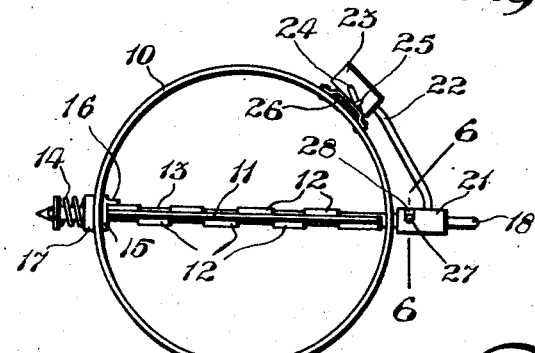
Figure 4:
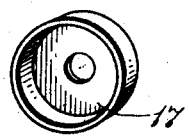
Figure 5:
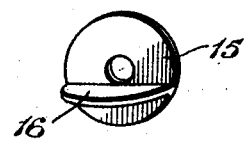
Figure 1:
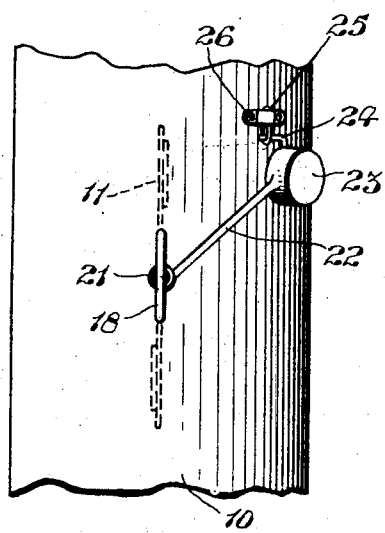
Figure 2:
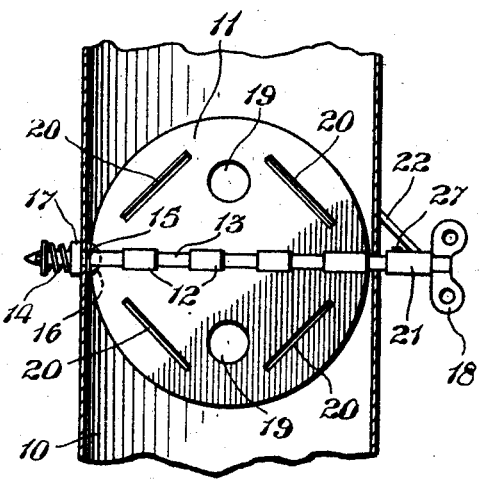

Referring now to the drawings in which like characters of reference indicate corresponding parts in each figure:

Figure 1 is an elevation of a section of stove pipe fitted with my improved automatic damper, Figure 2 is a longitudinal section through the pipe, Figure 3 is a plan view of Figure 1, Figures 4 and 5 are details of the outer and inner washer for the spindle or rod supporting the damper, Figure 6 is a section on line 6—6 of Figure 3, and Figure 7 is a detail of the suspension bracket.

Referring now more particularly to the drawings, in which a preferred example of my invention is disclosed, 10 designates a section of stove pipe in which is mounted a damper 11 rigidly secured through tubular offsets 12 formed therein to a transversely extending rotatable spindle 13 designed to protrude at each end beyond the pipe section 10 and as illustrated in Figures 2 and 3. The spindle 13 is provided, at one end outside of the pipe 10, with a coil spring 14 of well known construction and, within the pipe 10, with a washer 15 bent as at 16 on one side, (see Figure 5) to keep the damper 11 at this point up to the spindle 13 and cause friction to take place between the washer and the pipe 10. This washer moves with the spindle 13 through the bending up of the side. The spring 14 rests on a hollow washer 17 and provides tension to keep the damper 11 in whatever position it is operated to, the hollow washer being designed to insulate the spring 14 from the intense heat radiated by the pipe.

The opposite end of the spindle 13 is provided with a key 18 for manually operating it to turn the damper, the latter being provided with smoke openings 19 and a plurality of slots 20 with flanged sides designed to reinforce or stiffen the damper. Mounted on the spindle 13, between the key 18 and the outside of the pipe 10, is a sleeve 21 to which is connected a lever arm 22, the end of which is weighted at 23 and provided with a hook 24 designed to engage with a fusible link 25 carried by a bracket 26 rigidly secured to the outside of the pipe section 10, the bracket being arranged above the damper. The damper 11, Figure 2, is made slightly longer, in a direction at right angles to its axis, then the diameter of the pipe so that it will not turn completely around.

While the damper may be operated in the ordinary way by the key 18, it will be seen from the foregoing that it is automatically operable as when the pipe 10 reaches a predetermined heat or becomes overheated the fusible link 25, suspending the weighted lever arm 22, will burn or melt allowing the arm to drop by gravity and, through the sleeve 21 engaging the pin 27 mounted in the spindle 13, will cause the latter to turn automatically to close the damper 11, the slot 28 formed in the sleeve member permitting the manual operation of the damper.

The bracket 26 consists of two pieces 29 and 30, as here disclosed, the inside piece 29 being of copper and the outside piece or cover being of ordinary stove pipe material. The inside member is designed to conduct the heat quickly to the fusible link 25 and the outside or cover piece is adapted to form an air space, as shown, outside and under the copper. The bottom of the outside member is curved to conform to the contour of the pipe and provided with a slot large enough to admit the fuse and it is also designed to concentrate the heat at this point as the fuse would take much longer to reach the melting point without it.

The hook 24, coming directly under bracket 26, prevents the fuse being damaged by the damper 11 beyond the point where it is wide open. The fuse, which supports the weight 23, must pass between the conducting material of the bracket and around the hook 24.

As many changes could be made in the above construction and many apparently widely different embodiments of my invention, within the scope of the claims, constructed without departing form the spirit or scope thereof, it is intended that all matter contained in the present specification and accompanying drawings shall be interpreted as illustrative and not in a limiting sense.

What I claim as my invention is:

1. The combination with a stove pipe section having a spindle rotatably mounted therein and extending therebeyond, of a damper disc rigidly mounted on the spindle, a sleeve on one end of the spindle, a lever arm connected to said sleeve and provided with a weight at the opposite end, a bracket on the stove pipe and a hook on the weighted end of the lever arm and a fusible link between the bracket and the hook whereby the lever arm is suspended in raised position, whereby on the fusible link being consumed by the heat of the stove pipe, the lever arm automatically drops to turn the spindle to close the damper disc.

2. The combination with a stove pipe section having a spindle rotatably mounted therein and extending therebeyond, of a damper disc rigidly mounted on the spindle, a sleeve on one end of the spindle, a lever arm connected to said sleeve and provided with a weight at the opposite end, a bracket on the stove pipe and a hook on the weighted end of the lever arm and a fusible link between the bracket and the hook whereby the lever arm is suspended in raised position to allow of its being open, whereby on the fusible link being consumed by the heat of the stove pipe the lever arm automatically drops to turn the spindle to close the damper disc and means for locking the lever carrying sleeve comprising a pin on the spindle and a slot in said sleeve.

3. The combination with a spring actuated damper operating spindle formed with a protruding key on one end for stove pipes and the like, of a weighted lever arm pivotally mounted on the spindle, a fusible link for suspending the lever arm to hold the spindle in unlocked position, and whereby on the link being consumed, the lever arm drops by gravity to cause the spindle to close the damper and means for rigidly connecting the lever arm to the spindle on a predetermined point in its travel thereon being reached.

In witness whereof I have hereunto set my hand this 14th day of July, 1926.

JOHN COWIE.